United States Patent
Aiso et al.

(10) Patent No.: US 9,753,689 B2
(45) Date of Patent: Sep. 5, 2017

(54) AUDIO PROCESSING APPARATUS

(71) Applicant: Yamaha Corporation, Hamamatsu-shi, Shizuoka-ken (JP)

(72) Inventors: Masaru Aiso, Hamamatsu (JP); Masatoshi Hasegawa, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 0 days.

(21) Appl. No.: 15/192,688

(22) Filed: Jun. 24, 2016

(65) Prior Publication Data

US 2016/0380757 A1  Dec. 29, 2016

(30) Foreign Application Priority Data

Jun. 26, 2015 (JP) ................. 2015-128699

(51) Int. Cl.
  *H03D 3/24* (2006.01)
  *G06F 3/16* (2006.01)
  *H04H 60/00* (2009.01)
  *H04J 3/06* (2006.01)

(52) U.S. Cl.
  CPC ............. *G06F 3/162* (2013.01); *H04H 60/00* (2013.01); *H04J 3/0632* (2013.01); *H04J 3/0688* (2013.01)

(58) Field of Classification Search
  CPC .............................. H04L 7/033; H03L 7/0891
  USPC ............ 375/376, 346, 371; 381/22; 704/500
  See application file for complete search history.

(56) References Cited

U.S. PATENT DOCUMENTS

| 8,406,366 | B2* | 3/2013 | Hattori | ............... | H03L 7/22 375/354 |
| 2008/0159106 | A1* | 7/2008 | Immink | ............... | G11B 20/10009 369/59.17 |
| 2008/0317185 | A1* | 12/2008 | Mueller | ............... | H03D 3/006 375/376 |
| 2012/0314874 | A1* | 12/2012 | Fu | ............... | H04H 60/04 381/22 |

FOREIGN PATENT DOCUMENTS

| JP | 09-009399 A | 1/1997 |
| JP | 10-143998 A | 5/1998 |
| JP | 3085214 B2 | 9/2000 |
| JP | 3760483 B2 | 3/2006 |

* cited by examiner

*Primary Examiner* — Khai Tran
(74) *Attorney, Agent, or Firm* — Morrison & Foerster LLP

(57) ABSTRACT

In an audio processing apparatus configured to supply audio data to a processor configured to process audio data, a plurality of receivers, each configured to receive audio data and a work clock carried with the audio data and to supply the audio data to the processor; a plurality of PLL circuits corresponding to the plurality of receivers, each PLL circuit being configured to generate a clock signal based on a word clock received by the corresponding receiver; and a selector configured to select a clock signal from among a plurality of clock signals generated by the plurality of PLL circuits, and to supply the selected clock signal to the processor, the processor outputting the processed audio data at timing synchronized with the selected clock signal are provided.

9 Claims, 5 Drawing Sheets

{Fig. 1}
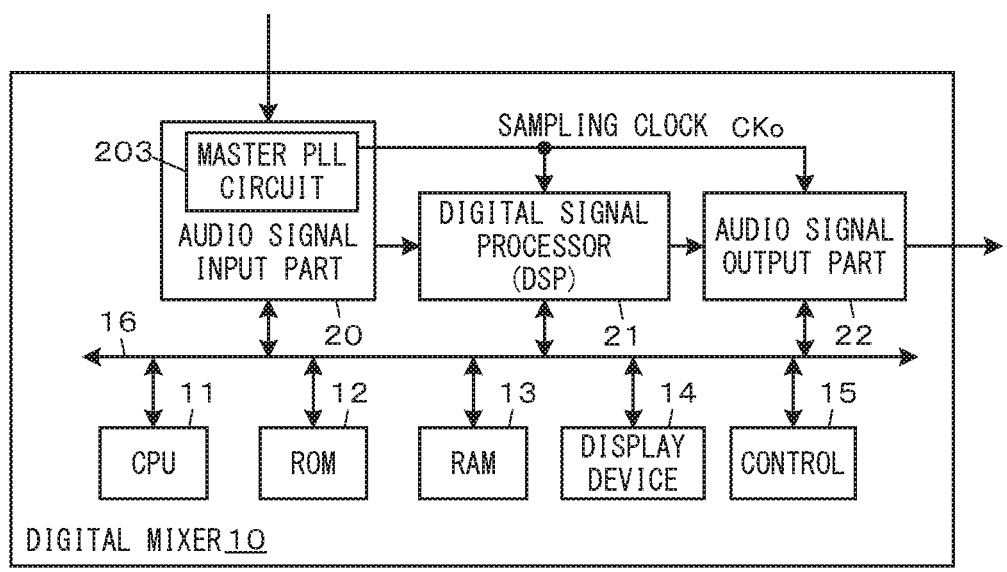

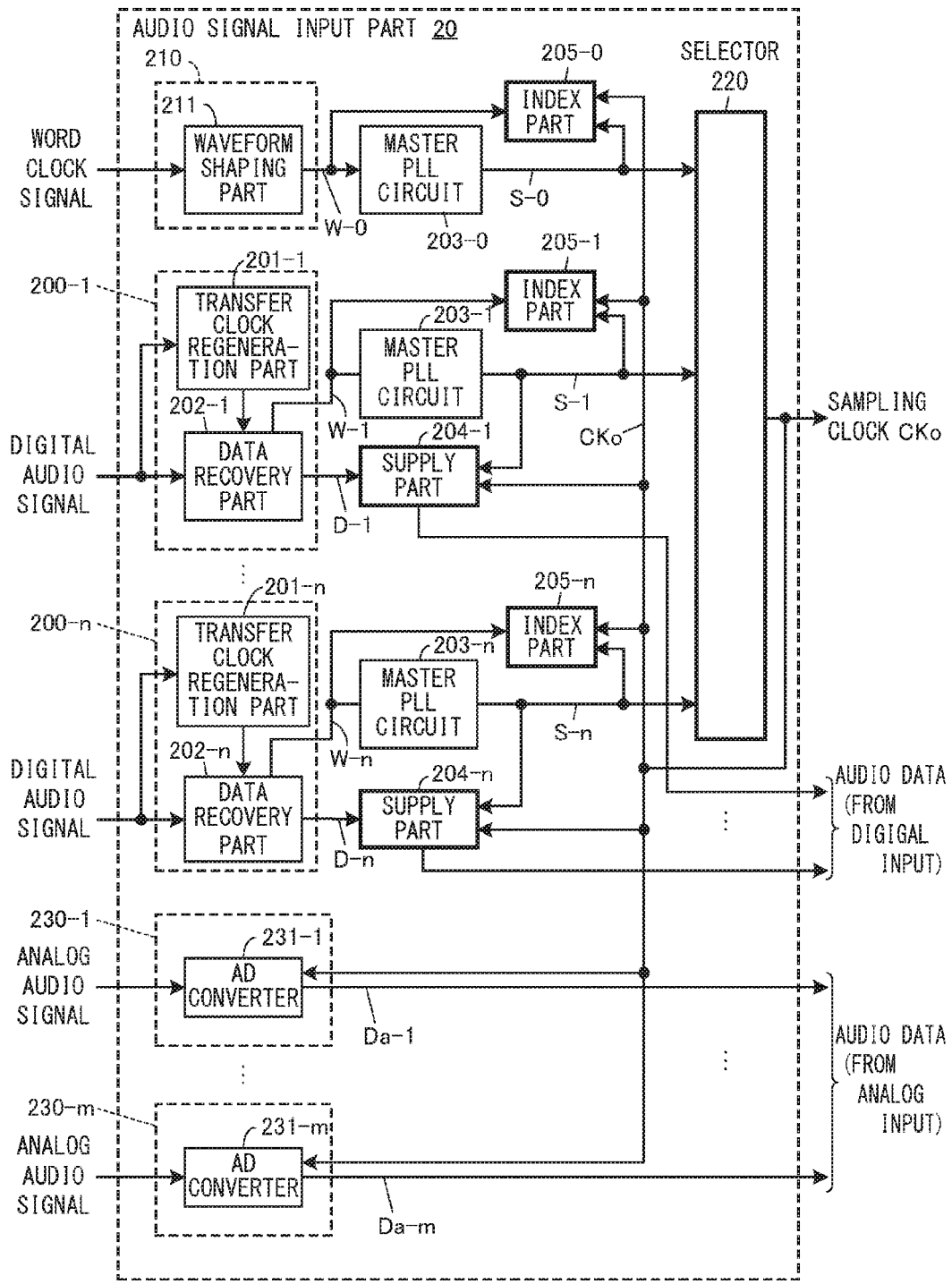
{Fig. 2}

{Fig. 3}
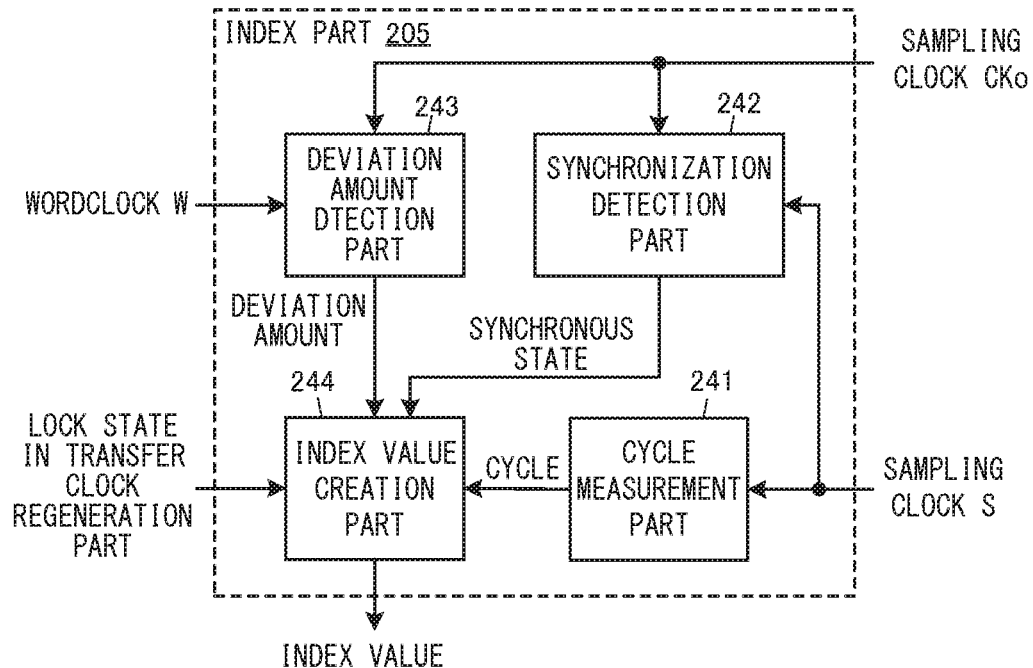
{Fig. 4}
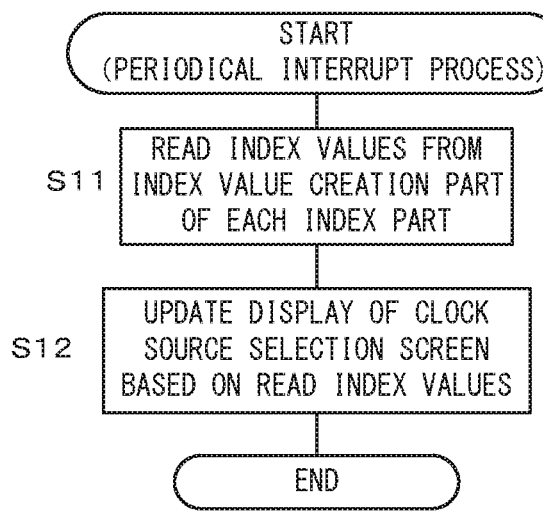

{Fig. 5}
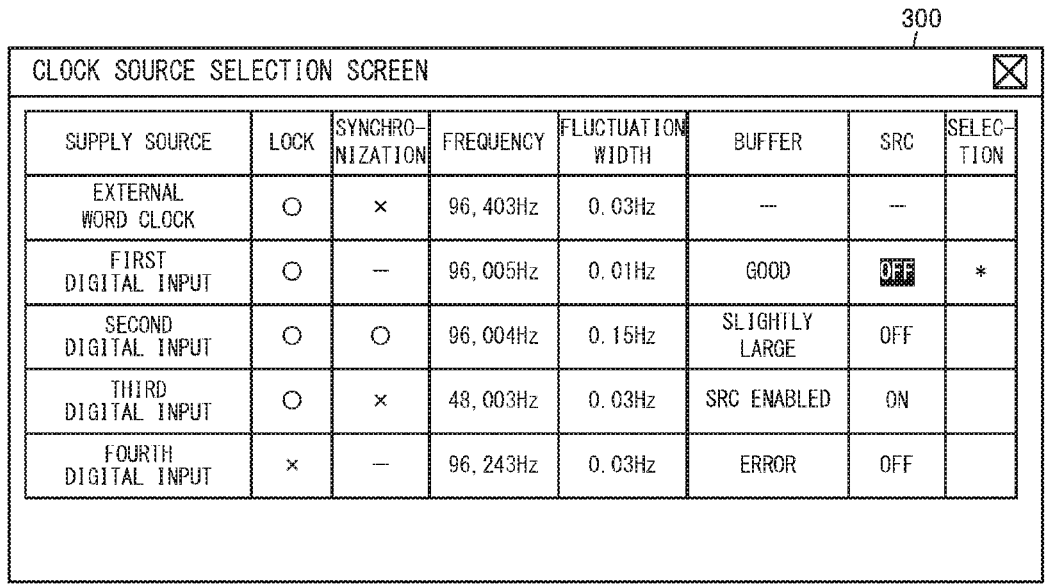
{Fig. 6}
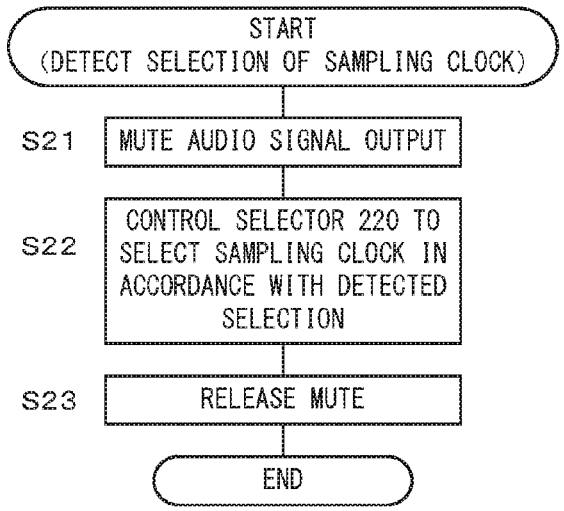

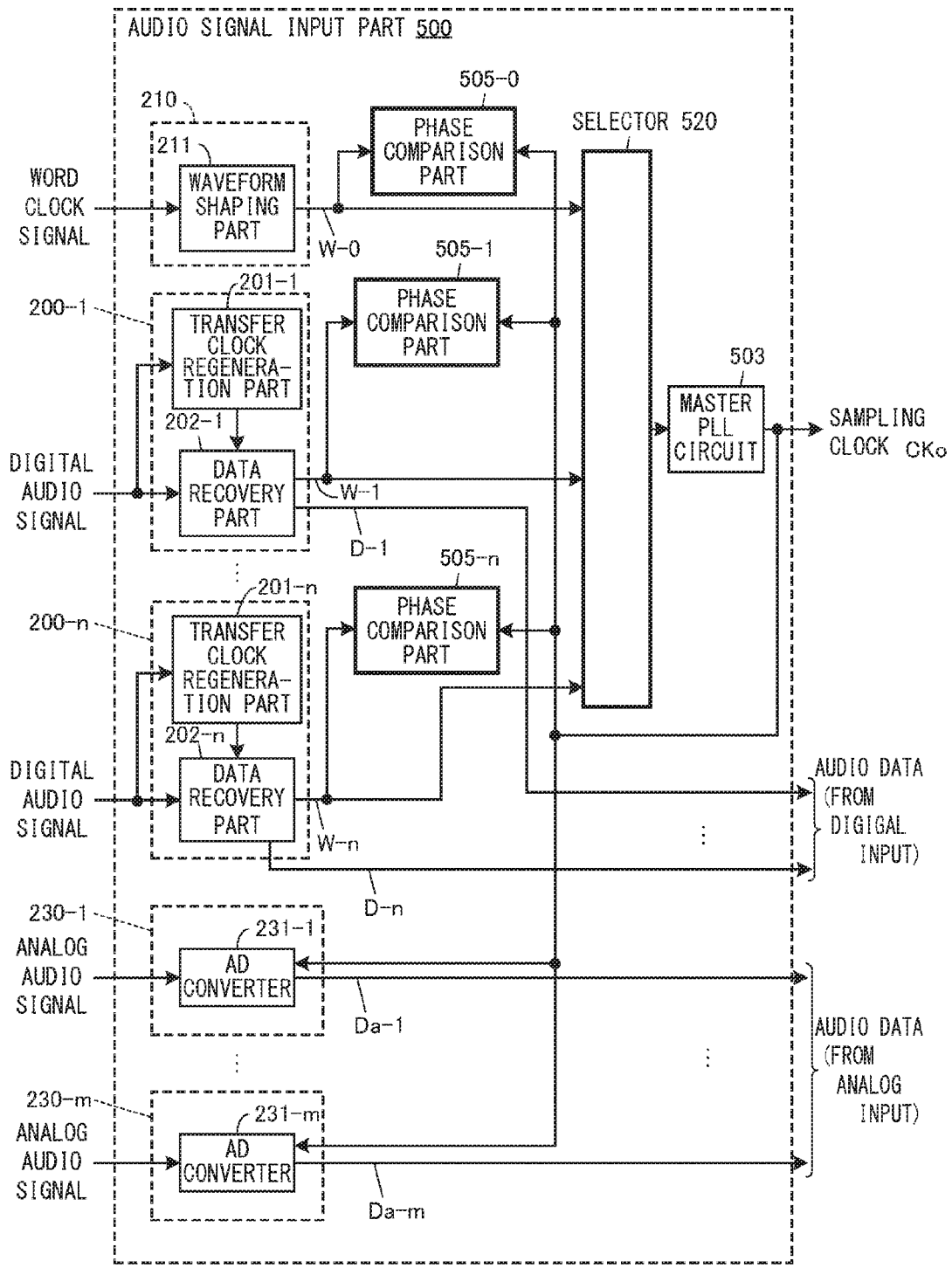

AUDIO PROCESSING APPARATUS

TECHNICAL FIELD

The invention relates to an audio processing apparatus.

BACKGROUND ART

In various audio processing apparatuses which process digital audio signals (called as "audio data") such as a digital mixer, it has been conventionally performed that the audio data is inputted from external device. Transmission of the audio data in this case may be performed through methods (protocols) using audio transmission lines such as AES-3 ™, MADI™ and ADAT™, and methods (protocols) using an audio network such as CobraNet™, Dante™ and EtherSound™, for example.

Here, it is common to the above-stated various transmission methods that a word clock (timing information) indicating timing (reproduction timing) to reproduce each sample of the audio data at a digital analog converter (DAC) is carried with the audio data, though formats of the timing information clock and procedures for the carrying are different depending on each method. Note that substances of the word clocks are various depending on the methods. In some method, the reproduction timing of samples is indicated by a change timing of a voltage of an electrical signal. In another method, the reproduction timing of samples is indicated by a time stamp. This word clock (in a broad sense) is a broader concept than a "word clock in a narrow sense" of one clock per one sample. In the present description, when it is stated as the "word clock" without distinguishing between the narrow sense and the broad sense, the "word clock in the broad sense" is indicated.

For example, in the audio transmission line, a reception timing (word clock) itself when each sample of audio data reaches a reception side is a reproduction timing of the sample. Since other data do not flow in a cable of the audio transmission line, a reception cycle of each sample, namely, a cycle of the word clock is stable.

Besides, according to EtherSound™, a reception side apparatus periodically (synchronous periodically) receives a packet in each cycle synchronous with reproduction timing of samples of audio data, and in each packet, there is one sample of audio data for each of a plurality of channels. A reception timing (word clock) when the packet reaches the reception side corresponds to the reproduction timing of each sample in the packet.

According to CobraNet™, a reception side apparatus synchronous periodically receives packets, and in each packet, there are continuous "n" samples of audio data for each of a plurality of channels. A reception timing (word clock) when the packet reaches the reception side corresponds to a reproduction timing of "n" samples, and the reproduction timing of each sample is obtained by 1/n subdividing each cycle of the reception timings (in other words, multiplying a frequency of the packets by n).

Note that according to such audio networks, packets other than the audio data also flow in the cable, and therefore, there is a slight fluctuation in a synchronous periodical transmission at a transmission side apparatus, and the reception timing of the packet, namely, the word clock becomes unstable compared to the audio transmission line.

According to Dante™, a reception side apparatus periodically (asynchronous periodically) receives a packet in each cycle asynchronous with reproduction timing of samples of audio data, and in each packet, there are a continuous plurality of samples of audio data for each of a plurality of channels and a time stamp (word clocks) of every n samples. Accordingly, the timing indicated by each time stamp is a reproduction timing of "n" samples of the audio data, and the reproduction timing of each sample is obtained by 1/n subdividing each cycle of the timings indicated by the time stamps (in other words, multiplying the frequency of the time stamps by n).

Note that according to such an audio network, the reproduction timing of each sample generated based on the time stamp is usually unstable compared to the case of the audio transmission line because there is a lag in time (a reference unit of the time stamp) commonly used among a plurality of apparatuses and there are delay and missing of the packets.

Incidentally, when the received audio data is reproduced at the reception side apparatus, a clock with very high frequency-stability is required as a sampling clock which defines the reproduction timing so as to enable a high-quality output. Such frequency-stable sampling clock can be generated by, for example, inputting the above-stated word clock to a master PLL (phase looked loop: phase synchronization) circuit whose cutoff frequency is extremely low.

However, when the audio data is received through a plurality of audio transmission lines and audio networks, the reception side apparatus also acquires the word clocks via each transmission line or via each network.

In such a case, one of the acquired word clocks is selected in accordance with an operation of a user or automatically, and the sampling clock is generated by inputting the selected word clock to the master PLL circuit, in a conventional apparatus described in PTL1 or PTL2.

CITATION LIST

Patent Literature

{PTL1} JP 3760483 B2
{PTL2} JP 3085214 B2

SUMMARY OF INVENTION

Technical Problem

However, there has been a problem in the conventional apparatus described in PTL1 or PTL2 such that when the selected word clock is changed, a certain period of time is required until the sampling clock generated from a newly selected word clock is stabilized. It is impossible to perform the reproduction of the audio data with sufficient quality during the period when the sampling clock is unstable, and therefore, it is necessary to mute (to narrow a level down to a degree where sound is not audible) an output of the audio data from the apparatus during the certain period of time until the sampling clock becomes stable when the selection of the word clock is changed.

Besides, as a standard for the selection of the word clock, for example, it is possible to measure and use a cycle of the word clock and a jitter. When a cycle of some word clock is stabilized and the jitter thereof is small, the sampling clock which is generated by the master PLL circuit based on the word clock is expected to have high frequency-stability. However, there is compatibility between the word clock and the master PLL, and there is a case when the qualities of the generated sampling clocks are largely different even if the word clocks whose measured cycles, jitters, and so on are approximately the same are used.

In the conventional apparatus described in PTL1 or PTL2, there has been a problem such that it is impossible for a user to judge which word clock is to be selected to obtain the sampling clock with the best characteristics when measurement values of a plurality of word clocks being selection candidates are approximately the same.

An object of the present invention is to solve the problems as stated above, and to enable to easily obtain a high quality clock as a clock defining reproduction timing of an audio signal by assisting the user to select the best word clock, which will cause the best characteristics, from a plurality of word clocks received with audio data by an audio processing apparatus.

Solution to Problem

In order to achieve the above-described object, au audio processing apparatus of the invention is configured to supply audio data to a processor to process the audio data, including: a plurality of receivers, each configured to receive audio data and a work clock carried with the audio data and to supply the audio data to the processor; a plurality of PLL circuits corresponding to the plurality of receivers, each PLL circuit being configured to generate a clock signal based on a word clock received by the corresponding receiver; and a selector configured to select a clock signal from among a plurality of clock signals generated by the plurality of PLL circuits, and to supply the selected clock signal to the processor, the processor outputting the processed audio data at timing synchronized with the selected clock signal.

In such an audio processing apparatus, it is conceivable that a detector configured to select each PLL circuit and to detect a period characteristic of the clock signal from the selected PLL circuit is further provided, and that the selector selects the clock signal based on the period characteristic of the clock signal from each PLL circuit detected by the detector.

Further, it is also conceivable that a display device configured to display the detected characteristic of the clock signal is further provided.

Alternatively, it is also conceivable that a plurality of detectors corresponding to the plurality of PLL circuit is provided, each detector being configured to detect a period characteristic of the clock signal from the corresponding PLL circuit, and that the selector selects the clock signal based on the period characteristics detected by the plurality of detectors.

Further, it is also conceivable that a user interface configured to display a plurality of period characteristics detected by the plurality of detectors is further provided.

Alternatively, it is also conceivable that the audio processing apparatus further includes a detector configured to detect a period characteristic of the clock signal from each PLL circuit; and a user interface configured to display the period characteristic of the clock signal from each PLL circuit and to accept a selection operation by a user, and that the selector selects the clock signal according to the selection operation.

Further, it is also conceivable that the displayed characteristic is a lock state of the PLL circuit, a frequency of the clock signal, or a frequency fluctuation width of the clock signal.

Alternatively, it is also conceivable that each receiver has a SRC function for calculating, based on the received audio data and the clock signal from the corresponding PLL circuit, virtual audio data at the timing synchronized with the selected clock signal.

Further, it is also conceivable that the SRC function of each receiver is either enabled or disabled, a receiver, of which the SRC function is enabled, supplies the virtual audio data to the processor, and a receiver, of which the SRC function is disabled, supplies the received audio data to the processor.

Advantageous Effects of Invention

The structure as described above enables to easily obtain a high-quality clock as a clock defining reproduction timing of an audio signal by assisting the user to select the best word clock, which will cause the best characteristics, from a plurality of word clocks received with audio data by an audio processing apparatus.

BRIEF DESCRIPTION OF DRAWINGS

FIG. 1 illustrates a hardware configuration example of a digital mixer being one embodiment of an audio processing apparatus of the invention.

FIG. 2 illustrates a configuration of an audio signal input part in FIG. 1 in more detail.

FIG. 3 illustrates a configuration of an index part in FIG. 2 in more detail.

FIG. 4 is a flowchart of a process periodically executed by a CPU of the audio processing apparatus in FIG. 1.

FIG. 5 illustrates a display example of a clock source selection screen.

FIG. 6 is a flowchart of a process executed by the CPU of the audio processing apparatus in FIG. 1 when a selection instruction of a sampling clock is detected.

FIG. 7 illustrates a configuration of a comparative example of the audio signal input part.

DESCRIPTION OF EMBODIMENTS

Hereinafter, embodiments of the invention are concretely described based on the drawings.

At first, a digital mixer being one embodiment of an audio processing apparatus of the invention is described. FIG. 1 is a block diagram illustrating a configuration of the digital mixer.

As illustrated in FIG. 1, a digital mixer 10 includes a CPU 11, a ROM 12, a RAM 13, a display device 14, a control 15, an audio signal input part 20, a digital signal processor (DSP) 21, and an audio signal output part 22, which are connected via a system bus 16. The digital mixer 10 is an audio processing apparatus which has a function to perform various signal processes in a plurality of signal processing channels on audio signals received at receivers to output the resultant audio signals.

Besides, the CPU 11 is a controller which controls overall operations of the digital mixer 10, and controls required hardware by executing required programs stored in the ROM 12. The CPU 11 realizes through the control various functions such as input and output of audio signals and other data via the audio signal input part 20 and the audio signal output part 22, display on the display device 14, detection of operations on the control 15, change of a value of a parameter and change of display in accordance with the detected operations.

The ROM 12 is a nonvolatile storage configured to store control programs or the like executed by the CPU 11. The ROM 12 may be made up of a flash memory being a rewritable nonvolatile storage.

The RAM 13 is a memory configured to store data to be temporarily stored and to be used as a work memory of the CPU 11.

The display device 14 is a user interface which displays various information in accordance with control by the CPU 11, and for example, it can be made up of a liquid crystal panel (LCD) and a light-emitting diode (LED). In an example described here, the digital mixer 10 includes an LCD with a size capable of displaying at least a clock source selection screen 300 illustrated in FIG. 4 as the display device 14.

The control 15 is another user interface to accept operations by a user to the digital mixer 10. The control 15 can be made up of various keys, buttons, rotary encoders, sliders, and so on. A touch panel which is stacked on the LCD being the display device 14 can also be used.

The audio signal input part 20 has at least a function to receive digital audio data from an external device, and includes a plurality of receivers configured to receive the audio data and a word clock carried with the audio data. As it is described in the background art section, the word clock is the timing information such as a reception timing of each packet containing audio data or a time stamp attached to audio data in each packet, and indicates reproduction timing of each sample of the audio data.

When the audio data of continuous plurality of samples are transmitted in one packet in the case of CobraNet™, Dante™, or the like, the timing information indicates not the reproduction timing of each sample but the reproduction timing of every "n" samples ("n" is an integer of two or more).

After required various signal processings are performed, each sample of the audio data is converted into an analog audio signal at the reproduction timing indicated by the word clock and then the analog audio signal is output.

Besides, the audio signal input part 20 includes a master PLL circuit 203 for each of the receivers of the digital audio signal. Bach of the master PLL circuits 203 receives a word clock acquired at the corresponding receiver and generates a sampling clock S (a candidate for a sampling clock CKo) from the word clock.

The sampling clock CKo is a clock defining the reproduction timing of the audio signal which is signal-processed in the DSP 21. For example, when a sample with 24 bits is reproduced for four channels using a DAC at a sample frequency of 50 kHz, the sampling clock CKo is set to a clock having a frequency of 128 times of the sample frequency of the audio signal. In this digital mixer 10, the clock S and the clock CKo are used also for a sample rate conversion, and therefore, higher accuracy is required. Hence a clock having a frequency of 1024 times of the sample frequency is therefore generated as the sampling clock S.

The audio signal input part 20 has functions to receive an analog audio signal and a word clock supplied from an external clock source, to select the sampling clock CKo to be supplied to the DSP 21 and the audio signal output part 22 from among a plurality of candidates, and so on in addition to the function to generate the sampling clock S. These functions will be described later by using FIG. 2.

The DSP 21 has functions to perform signal processing on each sample of the audio data supplied from the audio signal input part 20 in synchronization with each sampling cycle defined by the sampling clock CKo similarly supplied from the audio signal input part 20, and to output the processed audio data to the audio signal output part 22 at each timing synchronized with the sampling clock CKo. Note that it is not necessary for the DSP 21 to operate in strict synchronization with the sample cycle, and a quality of the signal processing in the DSP 21 is not dependent on quality of the sampling clock CKo.

For example, in case of the digital mixer, the signal processing performed by the DSP 21 includes an input patch processing for supplying any of a plurality of audio signals (audio data) from external to each of the plurality of input channels, an input channel processing of a plurality of input channel for performing various channel signal processing of each input channel such as level adjustment, frequency characteristic adjustment, effect addition on the audio data supplied to the input channel, a mixing processing of a plurality of mixing buses for mixing the processed audio data for each mixing bus by selectively supplying the processed audio data of each input channel to each mixing bus, an output channel processing of a plurality of output channels for performing various channel signal processing of each output channel corresponding to each mixing bus on the audio data mixed in the mixing bus, and an output processing for outputting the processed audio data of each output channel to one or more output ports of the audio signal output part 22 which is corresponded to the output channel.

The audio signal output part 22 has a function to convert the audio data after the processing by the DSP 21 into an analog audio signal at the reproduction timing defined by the sampling clock CKo at an internal DAC and output the analog audio signal to external. The audio signal output part 22 may have a function to transmit the audio signal corresponding to the reproduction timing indicated by the sampling clock CKo to an external device through various transmission methods by converting the reproduction timing into the word clock and adding the word clock to the audio data to be transmitted. Note that even when the audio data is transmitted to other devices as a digital data, the audio data will be finally converted into an analog audio signal anyway after arriving at the transmission destination. Considering the situation, it can be said that the sampling clock CKo "indicates the reproduction timing of samples of the audio data" even in case of transmission. Besides, various devices such as a sound generator like a powered speaker, a recorder, and further another audio processing apparatus are conceivable as an output destination and a transmission destination of the audio data. When an audio network is available, the audio signal output part 22 may output audio signals through the same network as the network used by the audio signal input part 20 to receive audio signals.

In the digital mixer 10 having the configuration as stated above, one of characteristic points is a configuration of the audio signal input part 20. Hereinafter, the configuration of the audio signal input part 20 is described in detail using FIG. 2.

As illustrated in FIG. 2, the audio signal input part 20 includes a plurality (here n-pieces) of digital audio signal receivers 200-1 to 200-*n* (a number after hyphen specifying an individual is called as a "subscript", and hereinafter, a reference sign without the subscript is used in case when it is not necessary to specify the individual. It is also the same as for other reference signs each with the subscript.), each of which receives audio data (one or more audio signals) and a word clock carried with the audio data through cables in various transmission methods. Besides, the audio signal input part 20 includes a plurality (here m-pieces) of analog audio signal input parts 230-1 to 230-*m*, each of which accepts an input of an analog audio signal, and a word clock input part 210 which accepts a word clock signal (a word clock in narrow sense).

Among them, an i-th receiver 200-$i$ (where 1≤i≤n) includes a transfer clock regeneration part 201-$i$ and a data recovery part 202-$i$. Besides, a master PLL circuit 203-$i$, a supply part 204-$i$ and an index part 205-$i$ corresponding to each receiver 200-$i$ are provided in the audio signal input part 20. In the drawing, the number "i" which corresponds to the receiver 200-$i$ is added to the reference sign of each part as a suffix. It is also the same as for later-described audio data D, word clock W, and sampling clock S.

Among them, the transfer clock regeneration part 201-$i$ has a function to receive a waveform of a bit sequence signal which is inputted through a cable of one of various transmission methods from external and generate a transfer clock which is synchronized with each bit of the bit sequence signal according to the corresponding transmission method. The transfer clock regeneration part 201-$i$ can be made up of a PLL circuit which has good follow ability against various bit rate of the bit sequence signal defined by the transmission method. Therefore, the frequency stability of the PLL circuit is not so high that the transfer clock generated by the PLL circuit for a transmission method other than the audio transmission line is not suitable for the sampling clock. Besides, even if the transfer clock is generated by the PLL circuit for the audio transmission line, the word clock with higher quality can be obtained by subjecting the transfer clock to the master PLL. The transfer clock regeneration part 201-$i$ also has functions to detect whether or not the transfer clock generated by the PLL circuit is locked to the bit sequence, and to supply the result (locked (lock) or not (unlock)) to the index part 205-$i$ as a lock state.

The data recovery part 2024 has functions to regenerate the bit sequence from the waveform of the bit sequence signal of each transmission method using the transfer clock generated by the transfer clock regeneration part 2014, and further to take out each sample of audio data D-$i$ (one or more audio signals) from the bit sequence. More specifically, the data recovery part 202-$i$ latches the waveform of the bit sequence signal at each timing indicated by the transfer clock, determines a value of each bit of the transmitted bit sequence, and takes the audio data of each sample out of the bit sequence in accordance with an algorithm defined in the transmission method.

For example, in case of the audio transmission line, by taking out (extracting) a specified number of bits for one sample from a bit sequence, and a sample of each audio data is reproduced every predetermined number of bits of the bit sequence. Besides, in case of the transmission method using a packet (an audio network), at first, a frame having a predetermined preamble bit pattern is taken out (extracted) from a bit sequence, a packet is taken out of the frame, further each samples of audio data in an audio signal area of the packet is taken out, and thereby, the audio data (one or more audio signals) is obtained.

A circuit such as an FPGA (field programmable gate array) to perform a take-out operation in accordance with the used transmission method is provided at the data recovery part 2024. The FPGA may perform a take-out operation in accordance with one transmission method selected from a plurality of transmission methods.

The data recovery part 202-$i$ supplies the audio data D-$i$ which is taken out of the bit sequence to the corresponding supply part 204-$i$. At this time, if the audio data of a plurality of channels are taken out, the data recovery part 202-$i$ supplies the audio data of each channel distinguishable each other.

Besides, the data recovery part 202-$i$ supplies a reception timing of each packet containing the audio data or a time stamp attached to the audio data in each packet to the master PLL circuit 203-$i$ and the index part 205-$i$ as a word clock W-$i$ indicating the reproduction timing of samples of the audio data.

The master PLL circuit 203-$i$ has a function to generate a sampling clock S-$i$ with high stability. The sampling clock S-$i$ follows the input word clock W-$i$ as for its phase and has 1024 times frequency of the sampling frequency of the word clock W-$i$. The master PLL circuit 203-$i$ supplies the generated sampling clock S to the supply part 204-$i$ and the selector 220.

Note that the selector 220 selects one clock from among a plurality of sampling clocks S generated in each of the master PLL circuits 203 corresponding to each of the receivers 200-1 to 200-$n$ or the word clock input part 210 and supplied to the selector 220, and supplies the one clock to the DSP 21 and the audio signal output part 22 as the sampling clock CKo defining the reproduction timing of each sample of the audio data, in accordance with an instruction from the CPU 11. The detail thereof will be described later. Besides, the selector 220 supplies the sampling clock CKo also to the supply parts 204 and the index parts 205 corresponding to each of the receivers 200-1 to 200-$n$.

The supply part 204-$i$ has a function (a buffer function) to supply each sample of the audio data input from the data recovery part 202-$i$ to the DSP 21 at each reproduction timing indicated by the sampling clock CKo. Besides, the supply part 204-$i$ further has an SRC (sampling rate conversion) function to calculate a virtual sample of the audio data D-$i$ at each reproduction timing indicated by the sampling clock CKo from samples of the input audio data D-$i$ so that the audio data D-$i$ can be passed to the DSP 21 without a sample skip noise even when the word clock W-$i$ and the sampling clock CKo are not synchronized with each other.

This SRC function is realized by, for example, storing a plurality of samples of the input audio data D-$i$ in a buffer, performing an interpolation process on the plurality of samples to calculate a sample value at each timing indicated by the sampling clock CKo.

This SRC function can be switched on and off (enabled and disabled) in accordance with an instruction from the CPU 11, and in the off (disabled) state, the above-described buffer function of the supply part 204-$i$ is enabled, and in the on (enabled) state, the SRC function is enabled.

When there is a timing lag between the word clock W-$i$ and the sampling clock CKo, the number of samples to be inputted to the supply part 204-$i$ and the number of samples to be outputted from the supply part 204-$i$ within a predetermined time period become different by an amount according to the lag. However, in a case where the buffer function is enabled, there is no problem unless the buffer overflows or becomes empty. If the lag is so large that the overflow of the buffer or exhaust of samples occurs, it is necessary to enable the SRC function and thereby interpolating and calculating a virtual sample at each timing of the sampling clock CKo from the input audio data.

Note that when the data recovery part 202-$i$ takes out audio data for a plurality of channels, the supply part 204-$i$ executes the buffer function and the SRC function for each channel independently. Incidentally, the turning on and off of the SRC function may be common to every channels.

The index part 205-$i$ has functions to perform various measurements regarding states of respective clocks based on the lock state supplied from the transfer clock regeneration part 201-$i$, the word clock W-$i$ supplied from the data recovery part 202-$i$, the sampling clock S-$i$ supplied from the master PLL circuit 203-$i$, and the sampling clock CKo supplied from the selector 220, and to generate various index values based on the results of the measurements.

A configuration of the index part 205-$i$ in more detail is illustrated in FIG. 3. Note that all of blocks in the drawing belong to the index part 205-$i$ though the suffixes "$i$" are omitted.

As illustrated in FIG. 3, the i-th index part 205 includes a cycle measurement part 241, a synchronization detection part 242, a deviation amount detection part 243, and an index value creation part 244.

Among them, the i-th cycle measurement part 241 has functions to measure the sample cycle indicated by the sampling clock S-$i$ supplied from the master PLL circuit 203-$i$ based on a system clock used for operation of the audio signal input part 20, and to supply the measured cycle to the index value creation part 244. The system clock has a far higher frequency than the sample cycle indicated by the sampling clock S-$i$, for example, a several hundred megahertz.

The i-th synchronization detection part 242 has functions to judge whether or not the sampling clock S-$i$ supplied from the master PLL circuit 203-$i$ and the sampling clock CKo supplied from the selector 220 are synchronized with each other, and to supply the result to the index value creation part 244 as a synchronous state. For example, when a phase difference between the sampling clock S-$i$ and the sampling clock CKo stays within a threshold value for a predetermined time or more, the result may be "synchronous" (synchronized), and the result may be "asynchronous" (not synchronized) in cases other than the above.

When the sampling clock S-$i$ generated by the corresponding master PLL circuit 203-$i$ is selected by the selector 220, the judgment result by the i-th synchronous detection part 242 is always "synchronous". However, when the sampling clock S-$i$ is not selected, there is a possibility that the judgment result is "synchronous" only when the word clock followed by the sampling clock CKo selected by the selector 220 and the word clock W-$i$ supplied to the master PLL circuit 203-$i$ are almost synchronized with each other, but the judgment result is always "asynchronous" in cases other than the above. Besides, the judgment result may be "asynchronous" resulting from fluctuation or the like of both word clocks even though they are almost synchronized with each other.

The i-th deviation amount detection part 243 has functions to detect a deviation, from a reference value, of the number of samples of the audio data stocked in the buffer, while the buffer function of the supply part 204-$i$ is enabled, and to output the detected value to the index value creation part 244 as a deviation amount.

The number of samples inputted to the buffer of the supply part 204-$i$ is an accumulated number of clocks of the word clock W-$i$, and the number of samples outputted from the same buffer is an accumulated number of clocks of the sampling clock CKo. Therefore, the number of samples of the audio data stocked in the buffer of the supply part 204 can be calculated by taking a difference between the accumulated numbers.

Accordingly, a current deviation amount can be calculated by initializing the deviation amount to zero when the number of stocked samples is the reference value of the buffer, then incrementing the deviation amount for every one clock of the word clock W-$i$, and decrementing the deviation amount for every one clock of the sampling clock CKo.

Note that while the SRC function of the supply part 204-$i$ is enabled, it is not necessary to care the number of samples in the buffer, and therefore, the deviation amount detection part 243 does not detect and output the deviation amount.

The i-th index value creation part 244 has functions to create various index values including information indicating period characteristics of the sampling clock S-$i$, based on various measurement and detection results supplied from the cycle measurement part 241, the synchronous detection part 242 and the deviation amount detection part 243, and the lock state supplied from the transfer clock regeneration part 201-$i$, and to provide the index values to the CPU 11. Here, the index values created by the index value creation part 244 are a lock flag, a synchronous flag, a maximum value and a minimum value of the deviation amount, and a maximum value and a minimum value of the cycle. The CPU 11 periodically reads these index values from the index value creation part 244.

The lock flag is a flag indicating whether or not the transfer clock is properly generated in the transfer clock regeneration part 201-$i$, and the value is created based on the lock state supplied from the transfer clock regeneration part 2014. The index value creation part 244 initializes the lock flag to "1" when the value of the lock flag is read by the CPU 11, and then, changes the lock flag to "0" (zero) when the lock state indicates unlock. Accordingly, if the unlock does not occur in a period from one reading to the next reading by the CPU 11, the value of the lock flag which is read next time is "1", and the value of the lock flag is "0" (zero) when the unlock occurs in the period.

The synchronous flag is a flag indicating whether or not the sampling clock S-$i$ and the sampling clock CKo are synchronized with each other, and a value thereof is created based on a synchronous state supplied from the synchronous detection part 242. The index value creation part 244 initializes the synchronous flag to "1" when the value of the synchronous flag is read by the CPU 11, and then, changes the synchronous flag to "0" (zero) when the synchronous state indicates asynchronous. Accordingly, if the asynchronization does not occur in a period from one reading to the next reading by the CPU 11, the value of the synchronous flag which is read next time is "1", and the value of the synchronous flag is "0" (zero) when the asynchronization occurs in the period.

The maximum value and the minimum value of the deviation amount indicate a fluctuation range of the deviation amount detected by the deviation amount detection part 243. When these values are read by the CPU 11, the index value creation part 244 sets a detected value of the deviation amount at that time as initial values of both the maximum value and the minimum value. After that, when the supplied detected value is larger than the maximum value, the maximum value is updated by the detected value, and when the supplied detected value is smaller than the minimum value, the minimum value is updated by the detected value. The maximum value and the minimum, value read by the CPU 11 are therefore the maximum value and the minimum value of the measured values of the deviation amounts during a period from one (the last) reading to the next (present) reading by the CPU 11.

The maximum value and the minimum value of the cycle are similarly obtained as the deviation amount and they indicate a fluctuation range of the cycle of the sampling clock S measured by the cycle measurement part 241. The CPU 11 reads the maximum value and the minimum value of the measured values of the cycle during a period from one (the last) reading to the next (present) reading by the CPU 11 from the index value creation part 244.

The explanation returns to FIG. 2.

At the audio signal input part 20, a waveform shaping part 211 of the word clock input part 210 has a function to shape the waveform of the word clock signal (the word clock in the narrow sense) inputted from external. The waveform shaping part 211 may be made up of a filter and a comparator.

Note that in the word clock signal whose waveform is shaped, an inversion timing of a voltage indicates the reproduction timing, and the word clock signal is handled in the same way as the word clock W outputted by the data recovery part 202. Here, this word clock is called as a word clock W-0 by using a suffix "0" (zero). Besides, the suffix "0" (zero) is also used for each of the master PLL circuit 203 and the index part 205 corresponding to the word clock input part 210.

Function of the master PLL circuit 203-0 is the same as the other master PLL circuits 203, and the master PLL circuit 203-0 generates a sampling clock S with high stability from the inputted word clock W.

Function of the index part 205-0 is almost the same as the other index parts 205. However, the word clock input part 210 does not include any corresponding supply part 204, and therefore, the deviation amount detection part 243 is not necessary, and the index value regarding the deviation amount is not created. Besides, the waveform shaping part 211 does not include a PLL circuit, and therefore, the lock flag is not created.

Besides, each of the analog audio signal input parts 230 includes an AD converter 231, performs AD conversion of an input analog audio signal at each timing indicated by the sampling clock CKo supplied from the selector 220, and supplies audio data Da obtained by this conversion to the DSP 21 one sample by one sample in each signal processing cycle of the DSP 21.

Next, processes executed by the CPU 11 to control each part of the audio signal input part 20 described hereinabove are described.

At first, a flowchart of a process periodically executed by the CPU 11 is illustrated in FIG. 4.

The CPU 11 starts the process illustrated in FIG. 4 at a periodical interrupt timing by every predetermined time. In this process, the CPU 11 firstly reads stored index values from the index value creation part 244-$i$ of each index part 205-$i$ (S11), and updates display of a clock source selection screen based on the index values (S12).

An example of the clock source selection screen displayed on the display device 14 is illustrated in FIG. 5.

The clock source selection screen 300 is a screen to display current states of the word clocks received by the audio signal input part 20 from external equipment together with each audio data, and to accept an operation to change selection of the sampling clock CKo at the selector 220 and a turning on and of operation of the SRC function at each supply part 204-$i$ from a user.

More specifically, information of "lock", "synchronization", "frequency", "fluctuation width", "buffer", "SRC", "selection" for each supply source of the word clock W (the digital audio signal receivers 200 and the word clock input part 210) are displayed at the clock source selection screen 300 under the control of the CPU 11.

Among them, the "lock" is a field to display the value of the lock flag read from the index value creation part 244-$i$. A symbol "○" represents that the lock state is continuing, and a symbol "x" represents that the unlock state occurs.

The "synchronization" is a field to display the value of the synchronous flag read from the index value creation part 244-$i$. A symbol "○" represents that the synchronized state is continuing, and a symbol "x" represents that the asynchronization occurs. Note that as for a supply source (a first digital input in the example in FIG. 5) whose sampling clock S is selected by the selector 220, the synchronous flag always indicates that the synchronized state is continuing. Hence, it makes no sense to allow the user to confirm the synchronization, and therefore, a symbol "-" which means "attention is not required" is displayed in the example in FIG. 5. Besides, when the transfer clock is not detected (a fourth digital input in the example in FIG. 5), neither the audio data nor the word clock is received by the receiver 200-$i$, and it makes no sense to detect the synchronization, and therefore, the symbol "-" is displayed also in this case.

The "frequency" is a field to display a frequency estimated value of the sampling clock S-$i$ calculated from an average of the maximum value and the minimum value of the sample cycle of the sampling clock S-$i$ read from the index value creation part 244-$i$ as the reciprocal of the average, the index value creation part 244-$i$ may calculate the frequency estimated value.

The "fluctuation width" is a field to display a fluctuation width (jitter) of the frequency of the sampling clock S-$i$ calculated as a difference between the reciprocals of the maximum value and the minimum value of the cycle of the sampling clock S-$i$ read from the index value creation part 244-$i$. The index value creation part 244-$i$ may calculate the fluctuation width of the frequency.

The "buffer" is a field to display an stock state of the audio data in the buffer of the supply part 204-$i$, while a frequency conversion function is turned off, based on the maximum value and the minimum value of the deviation amount read from the index value creation part 244. Here, at first, either of the maximum value or the minimum value whose absolute value is larger is selected as an object value X, and the value X is compared with three stages of threshold values T1 to T3 (where 0<T1<T2<T3), and a display in a plurality of stages based on the comparison results is performed. For the object value X within a range of −T1 to T1, "good" is displayed, "slightly large" is displayed for X within a range of T1 to T2, "large" is displayed for X within a range of T2 to T3, "error" is displayed for X out of a range of −T3 to T3, "little" is displayed for X within a range of −T3 to −T2 and "slightly little" is displayed for X within a range of −T2 to −T1.

When a deviation between the frequencies of the sampling clock S and the sampling clock CKo is continuously large, effect of the deviation is accumulated in the buffer, and the deviation amount (absolute value) becomes gradually large in a positive or negative direction. The user refers to the display of the "buffer", and grasps a state of the deviation amount of the frequency to judge whether or not the frequency conversion function of the supply part 204-$i$ is to be turned on.

Note that when the SRC function is enabled at a certain supply part 204-$i$, it is not necessary to care the stock state for the supply part 204-$i$, and therefore, the display of the "buffer" field is set to "SRC enabled" to indicate the state. Besides, the "error" may be displayed at the "buffer" field when the audio data is not normally inputted to the supply part 204-$i$, for example, the transfer clock is not properly generated.

The "selection" is a field to display which sampling clock S-i among the plurality of sampling clocks is selected by the selector 220 as the sampling clock CKo (which supply source is selected for the selector to select the sampling clock CKo), and to accept an instruction to change the selection from the user. The user can control the selector 220 to select the sampling clock S-i originated from the supply source "i" as the sampling clock CKo by clicking the "selection" field of an arbitrary supply source while referring to the display of the other fields.

The "SRC" is a field to accept from the user an instruction whether or not the SRC function at the supply part 204-*i* corresponding to each supply source is to be turned on. The user can switch enable and disable of the SRC function in the supply part 204-*i* corresponding to the supply source "i" by toggle by clicking the "SRC" field of the arbitrary supply source "i" while referring to the display of the other fields. Note that, as for the sampling clock S-i selected as the sampling clock CKo by the selector 220, the synchronization between the sampling clock S-i and the sampling clock CKo is constantly secured, and the frequency conversion is not necessary, therefore, the frequency conversion function is fixedly turned "off" (disabled). This is represented by displaying the "off" using outline characters in FIG. 5.

Next, a flowchart of a process executed by the CPU 11 when selection of the clock source by the user is detected is illustrated in FIG. 6.

When a click operation by the user in a "selection" field corresponding to a supply source "i" in the clock source selection screen 300 is detected (namely, a word clock W-i from a supply source "i" is selected as a clock to be followed by the sampling clock CKo), the CPU 11 starts the process illustrated in FIG. 6.

At first, the CPU 11 mutes the audio data outputted from the audio signal output part 22 (S21). After that, the CPU 11 controls the selector 220 to select the sampling clock S-i in accordance with the detected selection operation of "i" (S22), and release the mute of the audio data set at the step S21 (S23).

Here, the mute is performed to prevent that uncomfortable noises due to temporary turbulence occurred in the sampling clock CKo at the time of the selection change by the selector 220 are included in the audio signal processed in the DSP 21 and outputted from the audio signal output part 22.

However, all of the sampling clocks S-0 to S-n which can be selected by h selector 220 are the clocks whose frequencies are all stabilized at the master PLL circuits 203, and any of the clocks can be used as the sampling clock CKo without further stabilization. Accordingly, it is possible to immediately use the selected sampling clock as the reproduction timing in the audio signal output part 22 after the selection change, and therefore, the mute can be released promptly. The mute time required at the selection change time of the sampling clock S in therefore extremely short, and the user can perform the selection operation of the clock source without any stress.

Besides, in the digital mixer 10, the cycle measurement part 241-*i* as a measurement device configured to measure the cycle of the sampling clock S-i is provided for each master PLL circuit 203-*i*, and the result of the measurement is presented to the user on the clock source selection screen 300. Accordingly, the user can determine which sampling clock S-i is to be selected as the sampling clock CKo after checking a quality of not each word clock W-i itself supplied from each supply source "i" but the sampling clock S-i generated based on each word clock W-i. It is therefore possible to easily select the best supply source "i" to obtain the sampling clock CKo with high quality.

Here, a configuration of a comparative example of an audio signal input part according to a conventional art is illustrated in FIG. 7.

The same reference signs are also used in FIG. 7 for parts common to FIG. 2.

Configurations of each digital audio signal receiver 200-*i* and the word clock input part 210 at an audio signal input part 500 of the comparative example are basically same as those in the audio signal input part 20 in FIG. 2. Each data recovery part 202-*i* takes out the word clock W which is carried with the received audio data and supplies the word clock W to a selector 520. The waveform shaping part 211 is also same as that in FIG. 2. The selector 520 selects any one of the word clocks W-0 to W-n supplied from each data recovery part 202-*i* and the waveform shaping part 211, and supplies the selected word clock to a master PLL circuit 503. The master PLL circuit 503 generates the sampling clock CKo based on the selected word clock.

In case of this configuration, when the selection of the word clock is changed at the selector 520, it will take considerable time to stabilize the sampling clock CKo generated by the master PLL circuit 503 after the change. Accordingly, it is necessary to mute the audio data outputted from the audio signal output part 22 during the time, and the sound breaks for a considerable time (for approximately a few seconds).

Besides, it is possible to provide a phase comparison part 505 to judge if the word clock W-i supplied from each supply source "i" and the sampling clock CKo is synchronized or not. However, quality of a sampling clock to be generated based on each word clock W-i could not be known until the word clock W-i is selected and supplied to the master PLL circuit 503 and the sampling clock is actually generated based on the word clock W-i. Accordingly, if the sampling clock CKo with preferable quality is not obtained from the firstly selected word clock W, the user has to select another word clock. Finally, it might be necessary for the user to select and try all of the word clocks in turn so as to determine which word clock brings a sampling clock CKo with the highest quality. In addition, the mute of the considerable time is necessary for every selection, and bothers the user.

On the other hand, according to the configuration of the above-stated embodiment, the problem as stated above does not occur.

The description of the embodiment has been finished, but it goes without saying that a configuration of the apparatus, details of the screen, concrete procedures of the processes, the transmission method to be used, and so on are not limited to ones described in the above-stated embodiment.

For example, in the above-stated embodiment, the index parts 205 are provided to correspond to each of the digital audio signal receivers 200-1 to 200-*n* and the word clock input part 210, but it is not necessary. It may be conceivable that only one index part 205 is provided, and in that case, the user may select one of the receivers 200 and the word clock input part 210, and the only one index part 205 may be used to measure the state of the selected receiver 200 or word clock input part 200. Otherwise, each receiver 200 and the word clock input part 210 may be selected in turn automatically, and the state of the selected part may be measured to be displayed.

Besides, in the above-stated embodiment, an example is described where the CPU 11 periodically reads the index value from the index value creation part 244 for the display of the clock source selection screen 300. Conversely, it is also conceivable that the CPU 11 reads the index value to update the display of the clock source selection screen 300 through an interrupt processing when there occurs a change in some index values generated by the index value creation part 244.

Besides, when the CPU 11 reads the synchronous flag of "0 (asynchronization occurs)" while the buffer function of the supply part 204 is enabled as for a supply source, the audio data supplied from the supply source to the DSP may be muted. This is because the sample skip noise might mix into the audio data in this case.

Besides, the sampling clock S to be selected by the selector 220 may be automatically determined by the CPU 11 based on the index values created by each index part 205. For example, the CPU 11 may select the sampling clock whose frequency is within a predetermined range and whose fluctuation width is the smallest, or the CPU 11 checks the value of the synchronous flag while sequentially switching among some candidates (sampling clocks S), and selects one candidate which can synchronize with the most number of other sampling clocks, and so on.

Besides, in the above-stated embodiment, it is not essential to provide the word clock input part 210 and the analog audio signal input parts 230. On the other hand, it is also conceivable that a plurality of word clock input parts 210 are provided, the word clocks are inputted from a plurality of external devices, and the sampling clocks generated based on the word clocks are used as candidates of the selection at the selector 220. Besides, it goes without saying that the numbers of digital audio signal receivers 200 and analog audio signal input parts 230 are arbitrary.

Besides, the invention is applicable to any audio processing apparatuses each receiving a digital audio signal and timing information of a word clock carried with the digital audio signal, and generating a clock signal based on the timing information to be used for signal processing and timing control of an audio data output. For example, the invention is applicable to an effector, a recorder, an amplifier, a synthesizer, and so on. In addition, the invention is also applicable to a signal input apparatus which receives audio signals from external to supply the audio signals to a specific apparatus via a network, a signal output apparatus which outputs audio signals received from a specific apparatus via a network to external, and a powered speaker.

Besides, configurations and modification examples described hereinabove can be applied by appropriately combining with one another within a consistent range.

INDUSTRIAL APPLICABILITY

As it is obvious from the above-stated description, according to the invention, it is possible to realize an audio processing apparatus which can easily use a high quality clock signal as a clock defining reproduction timing of an audio signal.

REFERENCE SIGNS LIST

10 . . . digital mixer, 11 . . . CPU, 12 . . . ROM, 13 . . . RAM, 14 . . . display device, 15 . . . control, 16 . . . system bus, 20, 500 . . . audio signal input part, 21 . . . digital signal processor (DSP), 22 . . . audio signal output part, 200 . . . digital audio signal receiver, 201 . . . transfer clock regeneration part, 202 . . . data recovery part, 203, 503 . . . master PLL circuit, 204 . . . supply part, 205 . . . index part, 210 . . . word clock input part, 211 . . . waveform shaping part, 220, 520 . . . selector, 230 . . . analog audio signal input part, 231 . . . AD converter, 241 . . . cycle measurement part, 242 . . . synchronization detection part, 243 . . . deviation amount detection part, 244 . . . index value creation part, 300 . . . clock source selection screen, 505 . . . phase comparison part, D, Da . . . audio data, CKo, S . . . sampling clock, W . . . word clock

The invention claimed is:

1. An audio processing apparatus configured to supply audio data to a processor to process the audio data, comprising:
a plurality of receiver circuits, each configured to receive audio data and a word clock carried with the audio data and to supply the audio data to the processor;
a plurality of PLL circuits corresponding to the plurality of receiver circuits, each PLL circuit being configured to generate a clock signal based on a word clock received by the corresponding receiver circuit; and
selector circuitry configured to select a clock signal from among a plurality of clock signals generated by the plurality of PLL circuits, and to supply the selected clock signal to the processor, the processor outputting the processed audio data at timing synchronized with the selected clock signal.

2. The audio processing apparatus according to claim 1, further comprising
index circuitry configured to select each PLL circuit and to detect a period characteristic of the clock signal from the selected PLL circuit,
wherein the selector circuitry selects the clock signal based on the period characteristic of the clock signal from each PLL circuit detected by the index circuitry.

3. The audio processing apparatus according to claim 2, further comprising
a display configured to display the detected characteristic of the clock signal.

4. The audio processing apparatus according to claim 1, further comprising
a plurality of index circuits corresponding to the plurality of PLL circuits, each index circuit being configured to detect a period characteristic of the clock signal from the corresponding PLL circuit,
wherein the selector circuitry selects the clock signal based on the period characteristics detected by the plurality of index circuits.

5. The audio processing apparatus according to claim 4, further comprising
a user interface configured to display a plurality of period characteristics detected by the plurality of index circuits.

6. The audio processing apparatus according to claim 1, further comprising:
index circuitry configured to detect a period characteristic of the clock signal from each PLL circuit; and
a user interface configured to display the period characteristic of the clock signal from each PLL circuit and to accept a selection operation by a user,
wherein the selector circuitry selects the clock signal according to the selection operation.

7. The audio processing apparatus according to claim 6, wherein the displayed characteristic is a lock state of the PLL circuit, a frequency of the clock signal, or a frequency fluctuation width of the clock signal.

8. The audio processing apparatus according to claim 1, wherein each receiver circuit has a sampling rate conversion (SRC) function for calculating, based on the received audio data and the clock signal from the corresponding PLL circuit, virtual audio data at the timing synchronized with the selected clock signal.

9. The audio processing apparatus according to claim 8, wherein the SRC function of each receiver circuit is either enabled or disabled, a receiver circuit, of which the SRC function is enabled, supplies the virtual audio data to the processor, and a receiver circuit, of which the SRC function is disabled, supplies the received audio data to the processor.

* * * * *